United States Patent [19]
Watson et al.

[11] 3,991,349
[45] Nov. 9, 1976

[54] DROOP ADJUSTABLE CONTROL APPARATUS FOR DIRECT CURRENT MOTOR DRIVES

[75] Inventors: Wesley H. Watson, Williamsville; John M. Bentley, East Aurora, both of N.Y.

[73] Assignee: Westinghouse Electric Corporation, Pittsburgh, Pa.

[22] Filed: Jan. 3, 1975

[21] Appl. No.: 538,500

[52] U.S. Cl. .............................. 318/84; 318/100; 318/355; 318/530
[51] Int. Cl.² .......................................... H02F 5/46
[58] Field of Search ............... 318/41, 42, 77, 81, 318/84, 100, 355, 356, 529, 530, 532

[56] References Cited
UNITED STATES PATENTS

| | | |
|---|---|---|
| 3,079,538 | 2/1963 | Yamashita ........................ 318/84 X |
| 3,378,746 | 4/1968 | Weiser ............................. 318/356 X |
| 3,440,507 | 4/1969 | Derrick et al. ..................... 318/84 X |

Primary Examiner—Gene Z. Rubinson
Attorney, Agent, or Firm—C. M. Lorin

[57] ABSTRACT

A field-controlled direct current motor is provided with a circuit responsive to armature current which is adjustable as to the amount of armature current representative signal, and the adjusted current representative signal is used to provide a selected amount of droop in the speed-load characteristic of the motor. A plurality of individually field-controlled direct current motors operating in parallel on a common load are individually adjusted as to the amount of sensed armature current to provide through field control individual selected amounts of droop in the respective speed-load characteristics.

2 Claims, 4 Drawing Figures

DROOP ADJUSTABLE CONTROL APPARATUS FOR DIRECT CURRENT MOTOR DRIVES

CROSS REFERENCE TO RELATED APPLICATIONS

The present application is related to the following patent application which is assigned to the same assignee as the present application:

Ser. No. 546,849, which was filed on Feb. 3, 1975 by Walter R. Harris.

BACKGROUND OF THE INVENTION

The control apparatus according to the present invention finds general utility where one, or a plurality of direct current motors energized by a common power supply must be given a selected predetermined speed-load characteristic in situ for a particular application. It is particularly useful when a plurality of electric motors are required to drive in parallel a common load, as is typical in paper making when a multi-motor drive installation is used. An important requirement in such situation is that each motor share equally or proportionately the load. For load sharing between the motors, a certain similarity between the motor droop characteristics should exist, or if not identical from one motor to the other the motor characteristics must at least be in relation with the imposed different load requirements. Therefore, before starting parallel operation of the motors to be regulated preparatory adjustments have to be made on each motor. In this respect, one way of doing it is to align the motors on the known characteristic of one of them by changing the droop of the others in relation to the desired level of droop. Each motor has an inherent droop, but the latter may be too flat to accommodate the anticipated load changes. Additional droop must be obtained in relation to the increased armature current of the motor when the load increases. For this purpose, the conventional practice has been to add turns to the series field of the machine so that the motor flux increases proportionately to the armature current and thus the speed decreases proportionately. To this end, tests are usually conducted on the test floor in order to provide the required amount of series-field correction.

The use of the series field for such adjustments on the floor is not desirable because it prevents the employ of a standard motor. In addition, large motors are quite expensive to build with a high percentage of droop regulation in this conventional way, since it would take a large series-field winding to do it. If the motor has received such series field, it will be necessary to shunt it in order to get the desired droop.

The object of the present invention is to provide control apparatus for direct current motor drive which is readily adjustable to establish a selected predetermined speed-load characteristic.

Another object of the present invention is to provide direct current motors not requiring any particular series-field winding on the motor therefore.

A further object of the present invention, is to provide group control of parallel direct-current motor drives with individual and electronic adjustment of the motor speed characteristics in relation to load.

GENERAL CONSIDERATIONS RELATIVE TO THE INVENTION

This invention relates to motor drives as can be found in a paper making machine.

The droop of the speed-load characteristic of a shunt DC motor is relatively flat. It is known that more droop can be obtained with an additional series field winding influencing the flux of the machine as a function of the armature current. This is the well known compound motor in which the shunt field and series field effects can be cumulated in any desirable proportion. Indeed a compound machine can be designed so as to meet closely the customer's need in a particular industrial application.

The present invention finds its use in such situations where no such custom-made machine is sought for, or even possible, because of the necessity of adjusting the field of the direct current motor in situ, so that it can run with a specific speed-load characteristic as defined at the time of the installation of the process line and, or, of the operation thereof.

The speed-load characteristic of a motor must be adjusted on a test floor so that the rated speed of the machine is translated into effective driving speed as required by the application. Adjustment is also necessary between a plurality of motors which are driving a common load, because the characteristics of standard motors may be different. At any rate, the inherent characteristics of two motors are rarely identical. But the effective characteristics of parallel motors must be very similar in order to properly share the common load.

Figure 1:
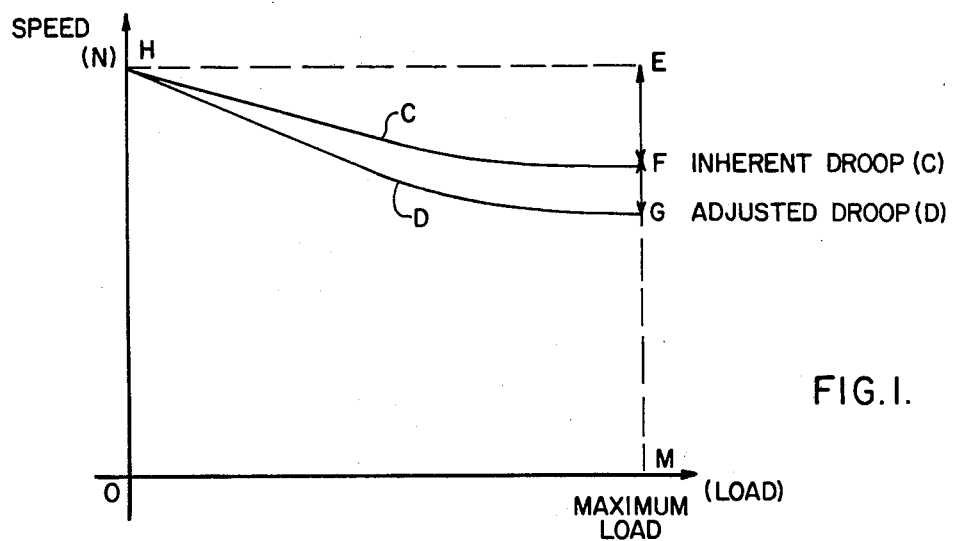
FIG. 1 shows by comparison the compound speed-load characteristic which is inherent in a direct current motor and the speed-load characteristic of the same motor with added droop obtained according to the present invention.

Referring to FIG. 1, a speed-load characteristic (C) typical of a shunt direct current motor is shown at HF as the inherent characteristic of the machine. H is the speed at no load. At maximum load the speed will have decreased from E to F. However, in an application, it may be required that the speed be reduced to G at full load. Testing must be conducted on the floor and adjustments made so that in operation the particular motor will follow the characteristic (D) from H to G when the load varies from zero to the maximum value contemplated. The additional droop FG has been obtained in the prior art by adjusting the series field, e.g. by shunting the available winding from an excess number of turns which had to be made available on the machine. As earlier mentioned, this is not a desirable solution.

THE INVENTION

The invention provides for a direct current motor having a selected compound speed-load characteristic obtained without the use of a series field, or at least with only the amount of series field as can be obtained with standard equipment. The invention also provides for a direct current motor having an adjustable compound speed-load characteristic in which a desired characteristic is obtained by control of the shunt field of the machine and not from any adjustment on the motor itself. The invention further provides for the installation of one or more standard motors with the employ of readily adjustable standard hardware connected in the shunt field regulator of such motor, or motors, to achieve a predetermined speed-load characteristic.

If a plurality of motors are used to drive a common load in parallel, the invention permits an easy adjustment of the characteristics of the various motors, so that they will share at all times the load equally, or proportionately.

The speed N of a motor is given by the following equation:

$$N = K \frac{Ei}{\phi} \qquad (1)$$

where, $\phi$ the flux from the stator winding, and $Ei$ the induced voltage developed in the armature at no load. When there is a load, the armature current I creates an ohmic drop RI and equation (1) becomes $$N = K \frac{E-IR}{\phi} \qquad (2)$$

where $E$ is the armature voltage. In a shunt field controlled machine the flux $\phi$ is a function of the field current. From equation (2) it appears that by controlling the field current it is possible to reduce the speed, e.g. by increasing the flux $\phi$, when the armature voltage E is regulated at a fixed value.

The present invention provides for an automatic adjustment of the motor flux in response to armature current in a selected amount and through shunt-field regulation. Although any form of excitation for shunt-field regulation can be used, the invention preferably uses solid state technology. Besides avoiding the use of a series-field, the invention affords the possibility of using standard hardware, especially printed circuit boards, which can be associated individually with any motor at the moment of installation and to afford for an easy adjustment of the motor operative characteristic to suit the needs of the particular application.

Figure 2:
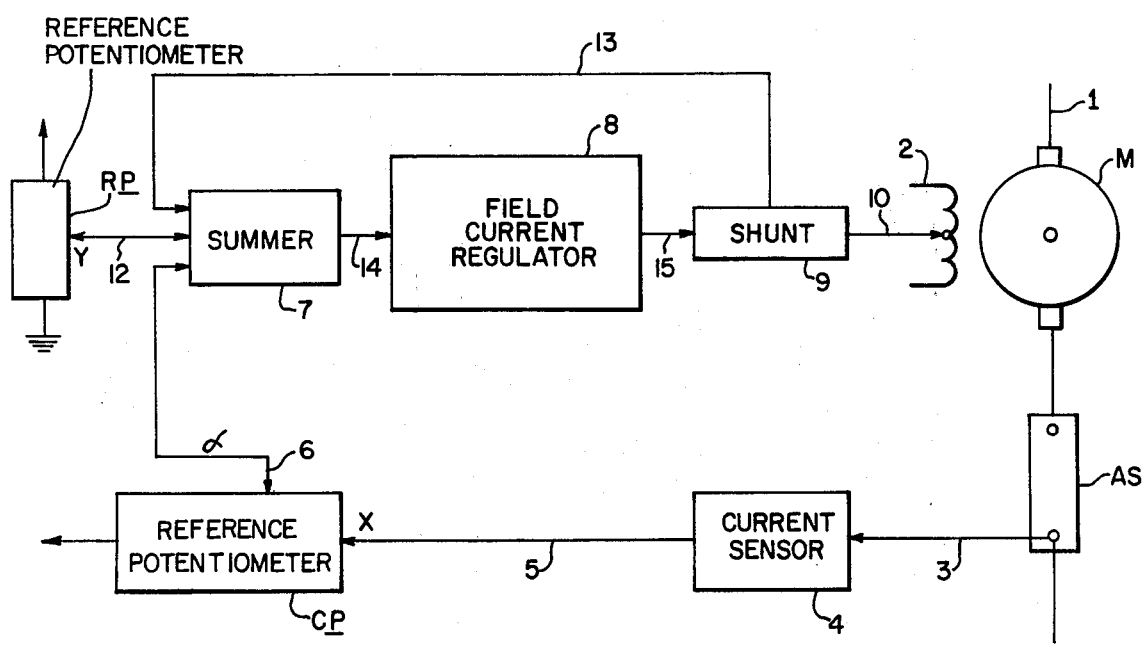
FIG. 2 illustrates in block diagram the control apparatus according to the present invention.

Referring to FIG. 2, a direct current motor M is shown supplied with armature current on line 1 and excited by a shunt winding 2. The field current is derived on line 10 from a field current regulator 8 via a shunt 9 used for feedback derivation on line 13. The field current regulator 8, which may be any controllable exciter for supplying the field current on its output line 15, preferably is a solid state regulator in which thyristors are gated in relation to the amplitude of a control signal received on the input line 14. In general the control signal on line 14 is determined by a reference signal Y received on line 12 from a reference potentiometer RP. Signal Y on line 12 is compared with the negative feedback signal on line 13 for automatic adjustment of the motor field at a magnitude corresponding to the setting of the reference potentiometer RP. This is in itself conventional. The control apparatus according to the present invention, however, presents the following novel and unique features:

From an armature shunt AS mounted in line 1 of the motor is derived via line 3 a current proportional to the armature current actually flowing through the motor. A current sensor 4 measures the armature current and supplies on line 5 a signal X representative of armature current. A calibration potentiometer CP is energized by line 5 and from the tap of this potentiometer, via line 6, any fraction $\alpha$ of the signal characteristic X is derived. A summer 7 is provided which is responsive at the input to the signals on respective lines 13, 12 and 6. Summer 7 generates on line 14 the input control signal for the field current regulator 8. Referring again to FIG. 1, it is seen that signal Y determines the zero load value of the speed, e.g. the position on the ordinate of point H. The inherent droop of the motor characteristic is assumed to be as shown by curve C on FIG. 1. The effect of the $\alpha$ signal on line 6 is to introduce a change in speed which is a function of the armature current, accentuating the droop by increasing the flux from winding 2, as shown by curve D on FIG. 1. After the motor has been installed and the field current regulator mounted as shown, it becomes a simple matter for the test operator to first adjust the armature voltage to the value required for the no load speed, then to conduct such tests as will indicate which portion of the tap on calibration potentiometer CP corresponds to the required additional droop percentage necessary.

THE PREFERRED EMBODIMENT

Figure 3:
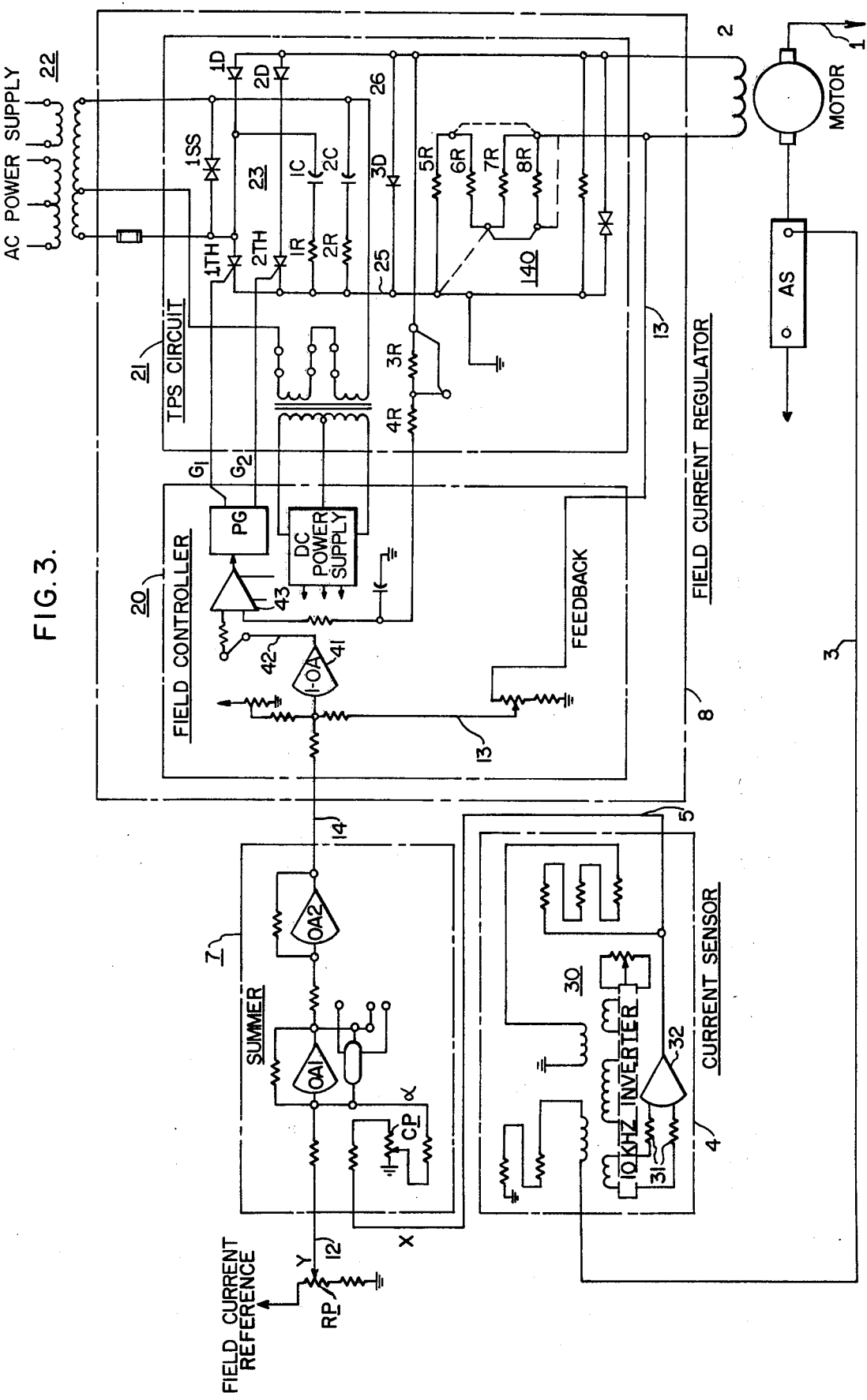
FIG. 3 shows the preferred embodiment of the present invention.

The invention will now be considered in more details by reference to FIG. 3 depicting the preferred embodiment. In particular, FIG. 3 shows the internal circuitry of current sensor 3, summer 7 and field regulator 8.

The current sensor 3 is essentially a direct current amplifier supplied with d.c. voltage, on lines 3 of both polarities, as derived from the armature current shunt AS. An inverter 30, operating at 10 KHZ, converts DC to AC and, aafter transformer coupling, AC to DC. The analog armature current signal so becomes an input signal supplied on lines 31 to an operational amplifier 32. The latter, on line 5 at the output thereof provides the signal X described earlier by reference to FIG. 2, which is a signal representative of the sensed armature current.

Summer 7 includes cascaded operational amplifiers $OA_1$, $OA_2$ providing on line 14 at the output thereof the earlier mentioned control signal for the field current regulator 8. At the input of operational amplifier $OA_1$ are summed the Y signal received on line 12 and the $\alpha$ signal which is a selected fraction derived from the calibration potentiometer CP connected to line 5 from the current sensor 4. Operational amplifier $OA_2$ has unity gain and is merely a conventional signal inverting device.

The current sensor and the summer are conventional equipment preferably of the type sold on the open market by Westinghouse Electric Corporation. The circuitry shown can be readily mounted on printed circuit boards. The current sensor is for instance of the model A130, a product of Westinghouse Electric Corporation. The field current regulator is for instance of the model known as the "F20 Controlled T.P.M. Assembly" (T.P.M. stands for: thyristor power modulation). The latter is used generally as a field exciter for direct current motors. This standardized package provides field excitation for a wide range of field currents and voltages. It requires either 230 or 345 VAC 50/60 Hertz single phase power supplied from an isolation transformer mounted separately. A field current feedback scaling potentiometer 40 is included for deriving on line 13 the feedback signal which is to be combined with the control signal, on line 14, at the input of an operational amplifier 41. The field current regulator comprises essentially a field controller 20 and a thyristor power supply (TPS) circuit 21. The T.P.S. circuit 21 is supplied with A.C. energy from a transformer 22. The A.C. is converted into D.C. field current by a single phase full wave rectifier bridge 23 including thyristors 1TH and 2TH associated with respective diodes, 1D, 2D. Between lines 25, 26 the field current is supplied to the field winding 2 of the motor.

A pulse generator P.G. generates gating pulses applied from terminals $G_1$, $G_2$ to the gate electrodes of the thyristors. The current sensing shunt 140 for the feedback loop consists of resistors 5R through 8R. 9R is a self-starting resistor used with highly inductive loads to initiate conduction of the thyristors. A surge suppression network is formed with resistors 1R and 2R, capacitors 1C and 2C, and surge suppressor 1SS. 3R and 4R are voltage feedback resistors.

Considering now the field controller 20, this circuit includes the earlier mentioned operational amplifier 41 at the output of which is derived the control signal which, on line 42, after amplification by amplifier 43 determines the time sequence of the gating pulses from the pulse generator PG. The latter includes a time basis which is regulated by a high gain linear voltage amplifier. The control signal on line 42 determines the current charging up a capacitor. Solid state devices are operated with a threshold to release pulses to the gate electrodes of thyristors 1TH and 2TH. The F20 field current controller is standard hardware, as earlier mentioned.

Figure 4:
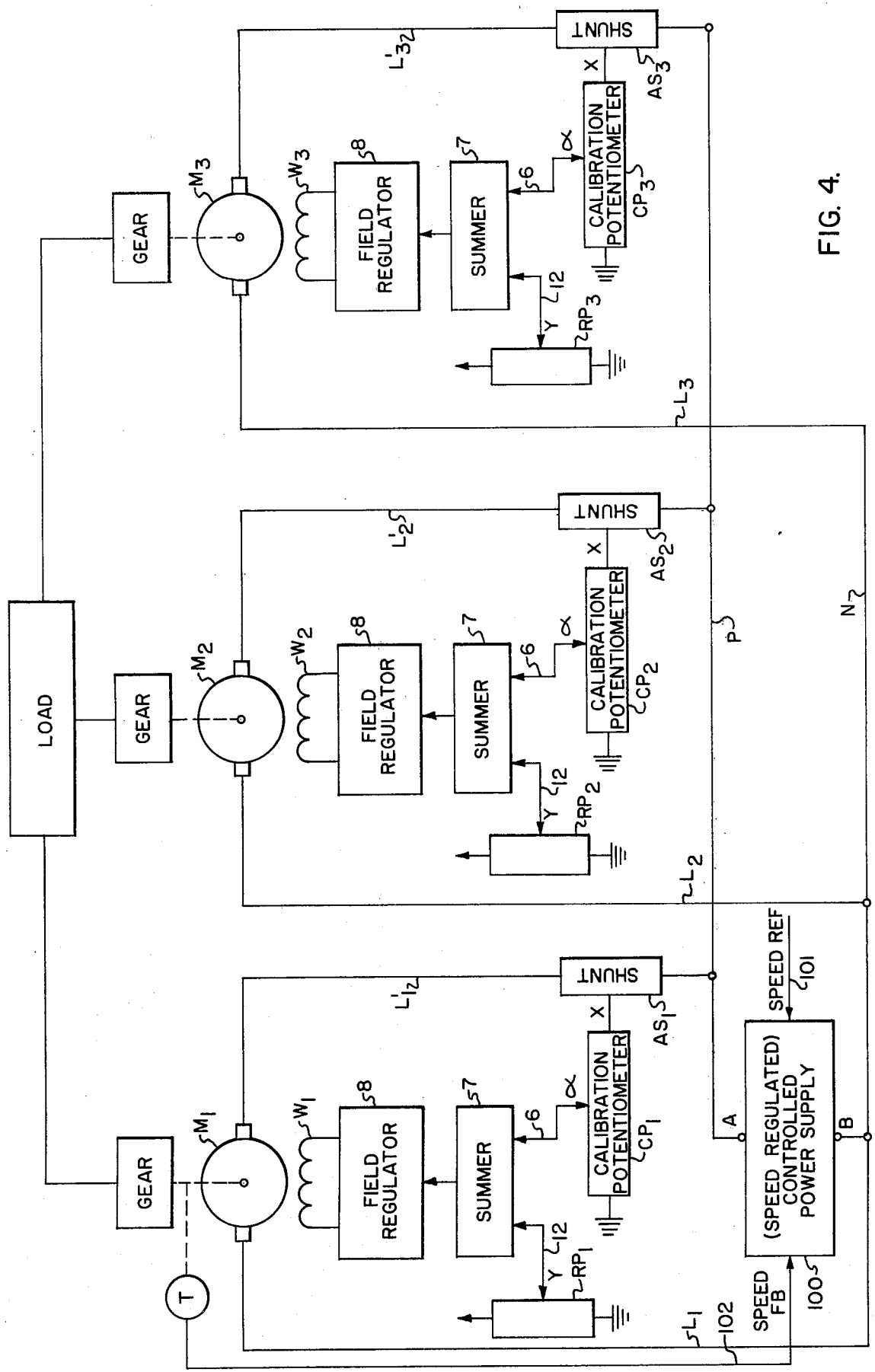
FIG. 4 depicts a plurality of motors operating in parallel with control apparatus according to the present invention.

Referring now to FIG. 4 an installation is shown in which a plurality of motors, $M_1$, $M_2$, $M_3$ are driving in parallel a common load. With each motor is associated a control circuit such as shown in FIG. 2, or FIG. 3. Thus, motor $M_1$ has a field winding $W_1$ supplied with controlled field current by a field regulator $FR_1$. The control signal to the field regulator $FR_1$ is supplied by a summer 7 responsive to a signal Y, on line 12, for speed regulation as prescribed for the common load and to a signal $\alpha$, on line 6, for calibration of the motor characteristic. Such calibration is conducted by manipulation of the calibration potentiometer $CP_1$ in line with the shunt line 5 carrying signal X as sensed from the armature shunt AS. A similar control circuitry is associated with each of the other motors $M_2 \ldots M_n$.

The motors are supplied with armature current on lines $L_1$, $L'_1$, $L_2$, $L'_2 \ldots L_n$, $L'_n$ respectively from a common D.C. power supply 100, which is controlled by a speed reference signal on line 101 and a speed feed back signal derived on line 102 from a tachometer associated with the lead motor shown to be motor $M_1$.

Calibration potentiometers $CP_1$, $CP_2$, $CP_n$ are set in order to properly adjust the motor fields and droop characteristics. Table I lists typical value of the inherent droop of various motors for specific industrial applications.

TABLE I

| Sections | Motor Power HP | Motor Speed N (in RPM) | At Speed N | | Inherent Droop % | No Load Volts (with inherent droop) |
|---|---|---|---|---|---|---|
| | | | Full Load Field Current | No Load Field Current | | |
| Motor $A_1$ | 700 | 920 | 11.0 | | 5 | 475 |
| Motor $A_2$ | 700 | 920 | 11.0 | | 8 | 463 |
| Motor $B_1$ | 600 | 994 | 6.5 | | 13 | 442 |
| Motor $B_2$ | 100 | 2186 | 2.3 | 2.9 | 13 | 442 |
| Motor $C_1$ | 100 | 1908 | 3.4 | 4.1 | 7 | |
| Motor $C_2$ | 100 | 1908 | 3.4 | 4.1 | 7 | |
| Motor $C_3$ | 100 | 1908 | 3.4 | 4.1 | 7 | 467 |
| Motor $C_4$ | 200 | 1050 | 5.4 | 5.9 | 5 | |
| Motor $C_5$ | 200 | 1050 | 5.4 | 5.9 | 5 | |
| Motor $D_1$ | 200 | 932 | 6.8 | 7.5 | 4 | |
| Motor $D_2$ | 600 | 931 | 7.8 | 9.7 | 12 | 446 |
| Motor $E_1$ | 300 | 1240 | 4.5 | 6.0 | 13 | 442 |
| Motor $E_2$ | 7½ | 2175 | .7 | .86 | 10 | 470 |
| Motor $F_1$ | 100 | 1860 | 3.7 | | 6 | |

A particular procedure could be followed starting from one motor, as the lead motor, and repeating it from one to the next until all motors are aligned with respect to the desired speed-load characteristic. Typically the droops of the motors would be set approximately at 12–15%. A typical procedure would be as follows, assuming that the direct current power supply (100 in FIG. 4) applies a 500 volts armature voltage to the motors:

a. The motors are run at rated speed, under no load condition. Then, the field of the lead motor (for instance $M_1$ on FIG. 4) is slowly adjusted by the Y signal potentiometer $RP_1$ so that the armature voltage equals the no-load volts equivalent to the desired total droop. This determines point H of the inherent characteristic (FIG. 1). For example, if motor M, is motor $A_1$ of Table I, thus having a 5% droop, whereas a total droop of 13% is desired, the afore-mentioned no-load volts equivalent sought for would be $500/1.13 = 442$ volts. The current sensor output lead 5 is disconnected from the calibration potentiometer (CP). A separate +3 volt signal is applied instead which represents 100% rated armature current. The calibration potentiometer ($CP_1$) is adjusted so that the armature voltage becomes equal to the no-load voltage, as taken from Table I (e.g. 475 volts for motor $A_1$).

b. Before proceeding further with the next motor, for instance $M_2$, and assuming motor $M_2$ corresponds to motor $A_2$ of Table I, the preceding motor (for instance $M_1$) is set so that the test signal is reduced to zero and the auxiliary test line is disconnected. Under such conditions the motor to be adjusted ($M_2$) is operated in parallel (thus on the same DC power supply as shown in FIG. 4), and at no load, with the already adjusted motor ($M_1$), or motors and free to run independently. The field is set by $RP_2$ so that the motor under test ($M_2$) runs at the rated speed thus N = 920 for motor $A_2$. Line 5 for that particular motor ($M_2$) is disconnected and a +3 volt test signal is supplied, instead of line 5, to the summer 7. The calibration potentiometer (CP2) is adjusted so that the motor speed drops by an amount equal to the desired droop (13% as earlier mentioned)

minus the motor inherent droop which is 8% as taken from Table I for motor $A_2$. Then the test signal is reduced to zero and the auxiliary test line is disconnected. After this, line 5 from the current sensor is connected again to the calibration potentiometer ($CP_2$).

c. The same procedure would be followed with the next motor ($M_3$). Table I shows only two motors $A_1$, $A_2$ in the particular section. Data for $M_3$ would be taken from a similar Table.

We claim:

1. In a multi-motor drive system including at least two direct-current motors operating in parallel, under a common controller operative with at least one predetermined variable, with each of said motors having a field winding supplied with field current and including means for regulating the field current in relation to a corresponding reference signal, one of said motors having a given droop characteristic which is a function of the armature current, the combination of:
    first means associated with the other motor for deriving a representative signal in relation with the armature current of said other motor;
    one adjustable means associated with said other motor for deriving a droop correction signal which is a selected fraction of the magnitude of said representative signal;
    second means associated with said other motor for summing a corresponding said reference signal and said droop corrective signal of said other motor to derive a field control signal;
    said field regulating means of said other motor being responsive to said field control signal; and
    said adjustable means of said other motor being adjusted so that the droop characteristic of said other motor is in a predetermined relation with the given droop characteristic of said one motor.

2. The multi-motor drive system of claim 1 further including a third direct current motor operating in parallel with said one and other direct current motors and under said common controller having a field winding supplied with field current and means associated thereto for regulating the field current in relation to a corresponding reference signal; said third direct current motor comprising:
    third means associated with said third motor for deriving a second representative signal in relation with the armature current of said third motor;
    second adjustable means associated with said third motor for deriving a second droop correction signal which is a selected fraction of said second representative signal of said third motor;
    fourth means associated with said third motor for summing a corresponding said reference signal and said second droop correction signal of said third motor to derive a corresponding second field control signal;
    said field regulating means of said third motor being responsive to said corresponding second field control signal; and
    said second adjustable means being adjusted so that the droop characteristic of said third motor is in a predetermined relation with the given droop characteristic of said one motor.

* * * * *